Tight & Loose Pulleys
Witnesses —
Leroy Dillenberg
Jas. K. Stevens
Joseph P. Gates, Inventor
By his Atty
J. F. Reigart
PATENTED
72014      DEC 10 1867
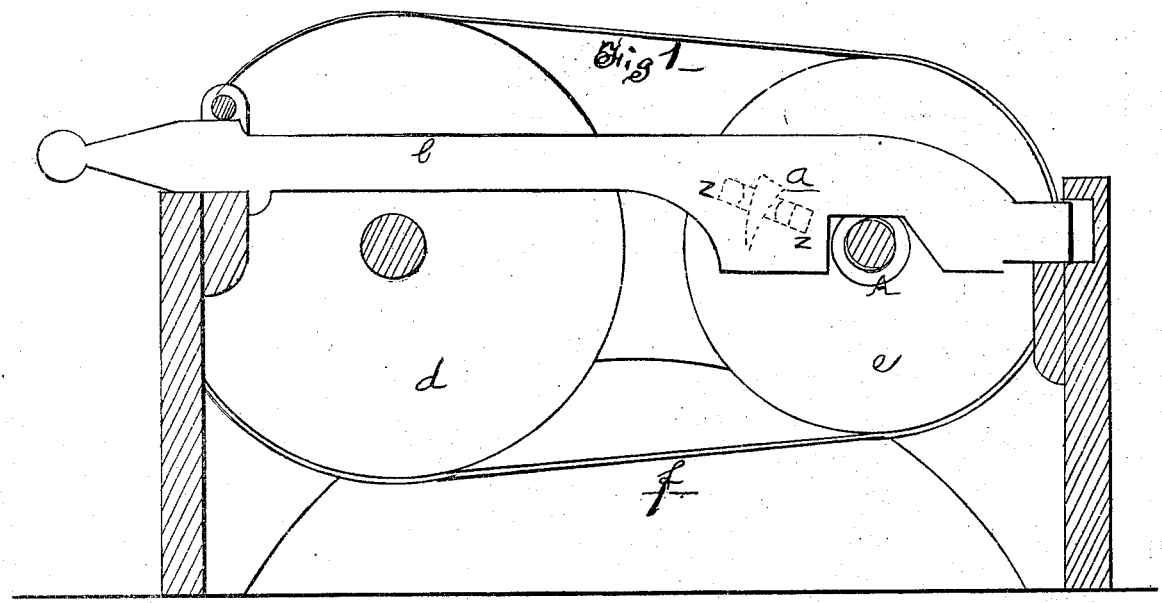
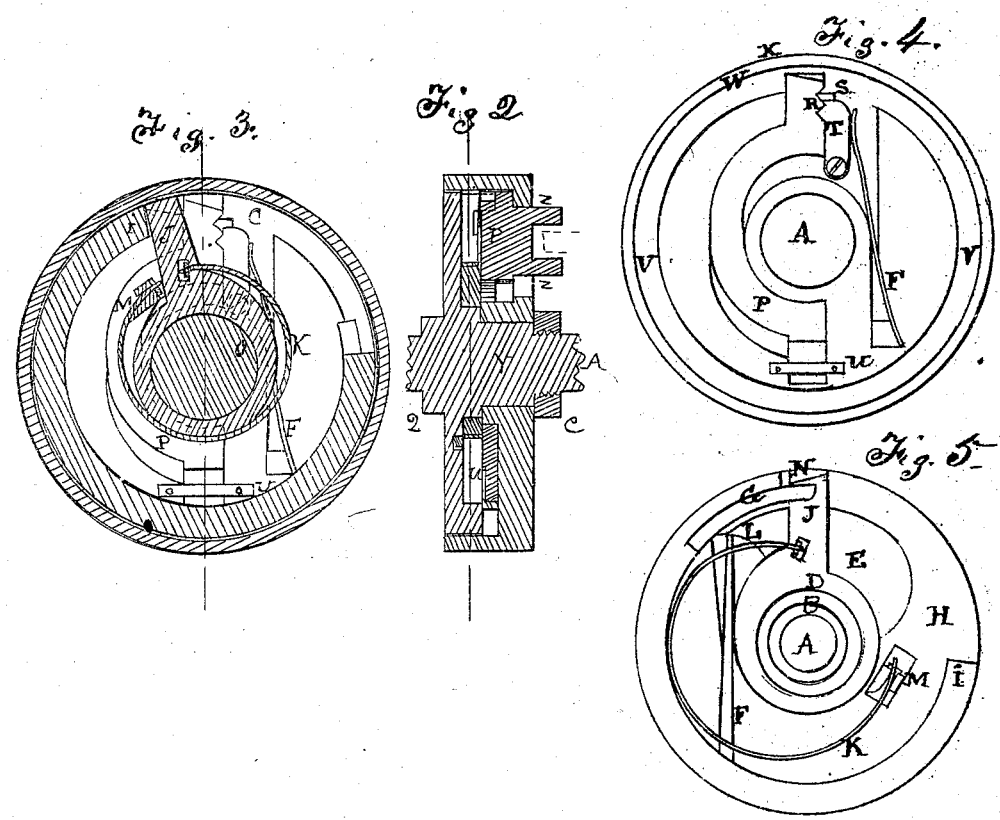

United States Patent Office.

JOSEPH P. GATES, OF LINCOLN, ILLINOIS.

Letters Patent No. 72,014, dated December 10, 1867.

IMPROVEMENT IN TIGHT AND LOOSE PULLEYS.

The Schedule referred to in these Letters Patent and making part of the same.

TO ALL WHOM IT MAY CONCERN:

Be it known that I, JOSEPH P. GATES, of Lincoln, county of Logan, and State of Illinois, have invented new and useful Improvements in Tight and Loose Pulleys; and I do hereby declare the following to be an exact description thereof, reference being had to the accompanying drawings, and to the letters of reference marked thereon, making a part of this specification, in which—

Figure 1 represents a side elevation,

Figure 2 a cross-section, and

Figures 3, 4, and 5 are the inside views of the pulley.

The nature of my invention consists in the construction of the pulley in two sections, with their arrangement and combination of devices operated as hereinafter described.

A, the shaft of loose pulley $e$; B, the inner seat for the outer section of pulley to revolve; C, deeper part of shuttle-key recess; D, the seat on which the ease-dog vibrates; E, a depressed recess for the ease-dog ram and ram-spring; F, the ram spring; G, the rebound-guard; H, a plane between the recess E and plane of elevation of D; I, a stop flange that limits the vibration and sweep of the ease-dog; J, the ease-dog, with its spring K, that relieves the shock of the connection of the two sections of the pulley; L, the ease-dog ram, with its spring F, that breaks the shock of the rebound of the ease-dog, when the two sections of the pulley are disengaged; M, the anchor that holds the one end of the spring K; N, a stop-nib on the ease-dog; O, bearing journal; P, the shuttle-key, of semicircular shape; Q, the shoulder on the shaft against the back of the pulley; R, the shuttle-key ratchet; S, a guide; T, the ratchet-dog; U, a bar across shuttle-key; V, a circular sunk recess for passage of the stop-nib N; W, a raised side face of periphery of pulley; X, extreme periphery of centre of belt-face of pulley; Y, the bearings of shaft A; Z Z are studs on shuttle-key P; $c$, screw-nut on shaft against the front of pulley; $a$, a cam that operates the shuttle-key studs Z, to throw the two sections of the pulley in and out of connection when required; $b$, the arm on which the cam $a$ is set, and by which the cam is moved to or from the shaft; $d$, a driving-band wheel; $e$, the tight and loose pulley; $f$, the belt.

When the pulley $e$, with all its devices, and with the shuttle-key P, cam $a$, and cam-arm $b$, are in position, and mounted upon the shaft A of a machine intended to be propelled, apply to it the belt $f$, from a revolving band-pulley, $d$, and the shaft on which the loose pulley $e$ is fixed at once receives the motion of the driving-pulley $d$. By moving the cam-arm $b$ with its cam $a$ towards the shaft A, the cam $a$ is brought in contact with the studs Z Z of the shuttle-key P, which disconnects the shuttle-key P from the stop-nib N on the ease-dog J; which disconnects the outer section from the inner section of the pulley. In this condition the outer section of the pulley revolves freely in the belt upon the seat B, on the inner section of the pulley, leaving the shaft at rest as if the belt had been shifted on to a loose pulley. The disconnection of the two sections of the pulley relieves the spring K, of the ease-dog J, of considerable tension, the reaction of which brings the ease-dog J and ram L against the ram-spring F, which receives and breaks the shock of the rebound. To fix the two sections of the pulley in connection, move the cam-arm $b$ from the shaft, which brings the cam $a$ in contact with the studs Z Z, which throws the shuttle-key P outward, so that in its enlarged sweep, it engages the stop-nib N, (on the ease-dog J,) and overcoming the tension of its spring K, presses it round to the stop-flange I, which completes the connection, being relieved by the tension of the ease-spring K, and the shaft revolves with the pulley as at first.

What I claim as my invention, and desire to secure by Letters Patent, is—

The construction of the pulley $e$ in two sections, with the arrangement and combination of the ram-spring F, the rebound-guard G, the stop-flange I, the ease-dog J, and spring K, the ease-dog ram L, the shuttle-key P, and studs Z, and arm $b$, with cam $a$, when constructed, arranged, and operated as herein described, and for the purposes set forth.

JO. P. GATES.

Witnesses:
J. FRANKLIN REIGART,
EDM. F. BROWN.